US009079769B2

(12) United States Patent
Iijima

(10) Patent No.: US 9,079,769 B2
(45) Date of Patent: Jul. 14, 2015

(54) METHOD AND APPARATUS FOR PRODUCING GASOLINE AND HYDROGEN FROM METHANOL

(71) Applicant: MITSUBISHI HEAVY INDUSTRIES, LTD., Tokyo (JP)

(72) Inventor: Masaki Iijima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 344 days.

(21) Appl. No.: 13/621,496

(22) Filed: Sep. 17, 2012

(65) Prior Publication Data

US 2013/0072725 A1 Mar. 21, 2013

(30) Foreign Application Priority Data

Sep. 21, 2011 (JP) ................... 2011-205919

(51) Int. Cl.
*B01J 8/06* (2006.01)
*C01B 3/22* (2006.01)
(Continued)

(52) U.S. Cl.
CPC . *C01B 3/22* (2013.01); *B01J 8/067* (2013.01); *C01B 3/323* (2013.01); *C10G 3/42* (2013.01);
(Continued)

(58) Field of Classification Search
CPC .............. B01J 8/00; B01J 8/02; B01J 8/0221; B01J 8/04; B01J 8/0446; B01J 8/06; B01J 8/067; B01J 19/00; B01J 19/24; B01J 19/2415; B01J 19/242; B01J 19/245; B01J 19/248; B01J 19/30; B01J 19/305; B01J 19/32; B01J 19/325; B01J 35/00; B01J 35/02; B01J 2219/00049; B01J 2219/00051; B01J 2219/00074; B01J 2219/00076; B01J 2219/00081; C01V 2203/12; C01V 2203/1205; C01V 2203/1211; C01V 2203/1217; C01V 2203/1223; C10G 2400/02
USPC .................. 422/129, 187, 198, 200, 201, 211
See application file for complete search history.

(56) References Cited

U.S. PATENT DOCUMENTS 3,894,103 A 7/1975 Chang et al.
3,894,104 A 7/1975 Chang et al.
(Continued)

FOREIGN PATENT DOCUMENTS

EP 1 650 160 A1 4/2006
JP 50-76027 A 6/1975
(Continued)

OTHER PUBLICATIONS

Extended European Search Report dated Jan. 7, 2013, issued in corresponding European Patent Application No. 12 184 793.3.

*Primary Examiner* — Natasha Young
(74) *Attorney, Agent, or Firm* — Westerman, Hattori, Daniels & Adrian, LLP

(57) ABSTRACT

A method and an apparatus for producing gasoline and hydrogen from methanol are disclosed. First, methanol is supplied to a first catalyst layer located in a reaction tube arranged in a reactor via a first methanol supply path to synthesize gasoline from the methanol. At the same time, methanol is supplied to a second catalyst layer located on the outer periphery of the reaction tube provided within the reactor from a second supply path, which serves as a methanol supply path, to generate hydrogen from the methanol. Heat generated in the first catalyst layer is conducted to the second catalyst layer through the reaction tube to heat the second catalyst layer to a predetermined temperature.

6 Claims, 1 Drawing Sheet

(51) Int. Cl.
*C01B 3/32* (2006.01)
*C10G 3/00* (2006.01)
*B01J 8/00* (2006.01)
*B01J 8/02* (2006.01)
*B01J 8/04* (2006.01)
*B01J 19/00* (2006.01)
*B01J 19/24* (2006.01)
*B01J 35/00* (2006.01)

(52) U.S. Cl.
CPC ......... *C10G 3/60* (2013.01); *B01J 2208/00132* (2013.01); *B01J 2208/00274* (2013.01); *B01J 2208/00283* (2013.01); *B01J 2208/00309* (2013.01); *C01B 2203/0233* (2013.01); *C01B 2203/0838* (2013.01); *C01B 2203/1058* (2013.01); *C01B 2203/1064* (2013.01); *C01B 2203/1076* (2013.01); *C10G 2300/4037* (2013.01); *C10G 2400/02* (2013.01)

(56) References Cited

U.S. PATENT DOCUMENTS

| | | |
|---|---|---|
| 3,894,105 A | 7/1975 | Chang et al. |
| 3,894,106 A | 7/1975 | Chang et al. |
| 3,894,107 A | 7/1975 | Butter et al. |
| 3,906,054 A | 9/1975 | Kaeding et al. |
| 3,907,915 A | 9/1975 | Chang et al. |
| 3,911,041 A | 10/1975 | Kaeding et al. |
| 3,962,364 A | 6/1976 | Young |
| 3,965,208 A | 6/1976 | Butter et al. |
| 3,972,832 A | 8/1976 | Butter et al. |
| 3,998,898 A | 12/1976 | Chang et al. |
| 4,002,698 A | 1/1977 | Kaeding |
| 4,039,600 A | 8/1977 | Chang |
| 4,044,065 A | 8/1977 | Butter et al. |
| 4,052,479 A | 10/1977 | Chang et al. |
| 4,076,761 A | 2/1978 | Chang et al. |
| 4,138,442 A | 2/1979 | Chang et al. |
| 4,418,236 A * | 11/1983 | Cornelius et al. ............. 585/408 |
| 6,541,142 B1 | 4/2003 | Yu et al. |
| 6,924,399 B2 * | 8/2005 | Iijima et al. .................. 568/698 |
| 2006/0014061 A1 | 1/2006 | Kim et al. |
| 2006/0194085 A1 | 8/2006 | Son et al. |
| 2007/0049647 A1 | 3/2007 | Van Egmond et al. |
| 2007/0078285 A1 * | 4/2007 | Dagle et al. .................. 568/698 |
| 2007/0225383 A1 | 9/2007 | Cortright et al. |
| 2008/0093583 A1 | 4/2008 | van den Oosterkamp et al. |

FOREIGN PATENT DOCUMENTS

| | | |
|---|---|---|
| JP | 51-57688 A | 5/1976 |
| JP | 10-506668 A | 6/1998 |
| WO | 96/15082 A1 | 5/1996 |

* cited by examiner

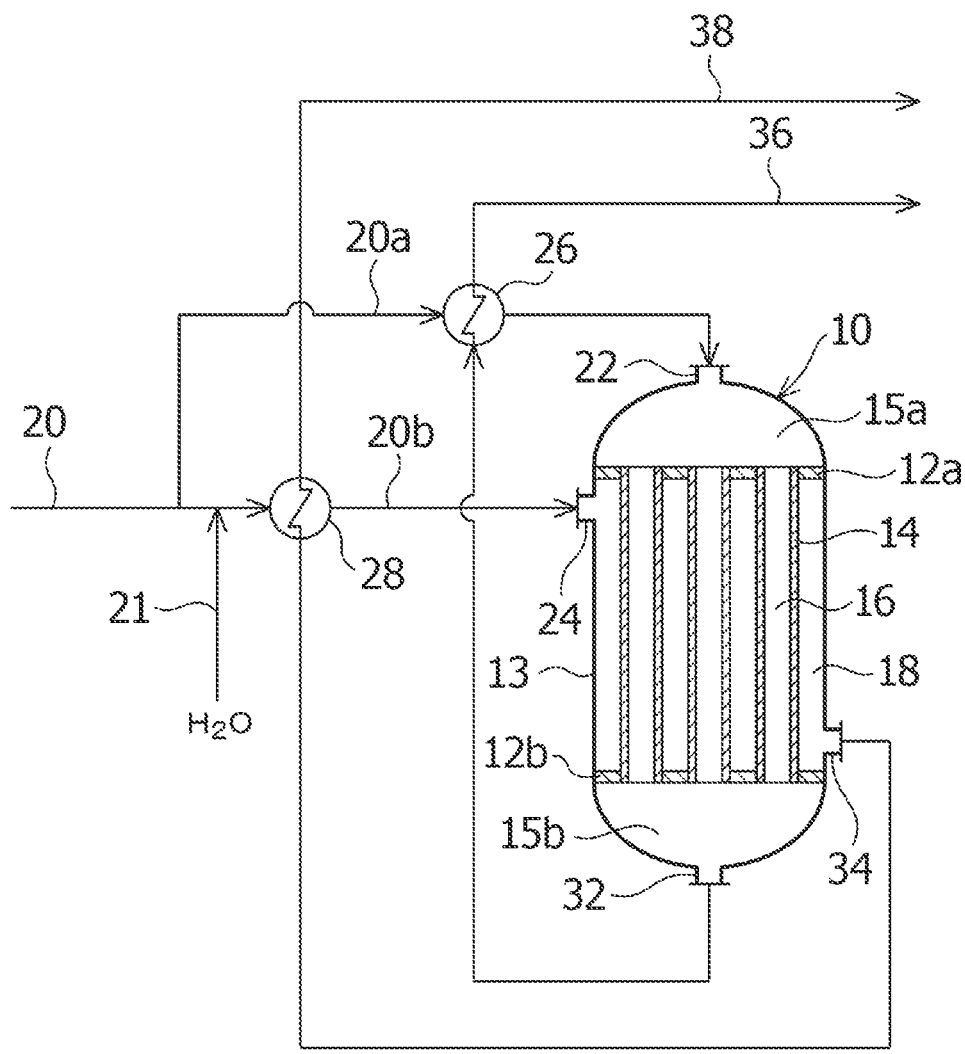

METHOD AND APPARATUS FOR PRODUCING GASOLINE AND HYDROGEN FROM METHANOL

CROSS-REFERENCE TO RELATED APPLICATION

This Application claims priority from Japanese Patent Application No. 2011-205919 filed on Sep. 21, 2011, which is incorporated herein by reference in its entirety.

BACKGROUND OF THE INVENTION

The present invention relates to a method and an apparatus for producing gasoline and hydrogen from methanol, and more particularly to a method for producing gasoline (liquid fuel), hydrogen, and carbon monoxide from methanol.

It has long been known that methanol can be converted to dimethyl ether (DME) or to gasoline therethrough under a catalyst, as disclosed in Japanese Patent Application Publication No. 50-076027 and Japanese Patent Application Publication No. 51-057688. The reaction for synthesizing DME or gasoline from methanol under the catalyst must be executed at as high a temperature as about 400° C. This synthetic reaction is exothermic, and thus, it is necessary to continually cool the reactor for maintaining the temperature thereof within a predetermined range.

Also, Japanese Patent Application Publication No. 10-506668 discloses a system including plural reactors each containing a catalyst for converting methanol to gasoline, the plural reactors being arranged in series. A gas product discharged from the first reactor of the system is mixed with methanol and dilution gas to produce a mixed gas, of which the temperature is controlled within a predetermined range by adjusting the temperature and the components of the dilution gas, and then, this mixed gas is supplied to the second reactor of the system to obtain a new gas product.

SUMMARY OF INVENTION

However, the system for producing gasoline from methanol disclosed in Japanese Patent Application Publication No. 10-506668 is too complicated, and thereby, an inside chamber of the reactor cannot be cooled directly to maintain the reactor within a predetermined temperature range.

Accordingly, in view of the above-described problem, an object of the present invention is to provide a method and an apparatus for producing gasoline and hydrogen from methanol, in which hydrogen is produced from methanol by using heat generated in gasoline synthesizing reaction of methanol, in order to construct the apparatus without any complicated structure, the method allowing the heat generated by the reaction to be directly used effectively.

To achieve the above-described object, according to an aspect of the present invention, there is provided a method for producing gasoline and hydrogen from methanol, the method including the steps of: inducing a reaction of synthesizing gasoline from a part of methanol; inducing a reaction of generating hydrogen from another part of methanol; and utilizing heat generated in the gasoline synthesis reaction to the hydrogen generation reaction by carrying out the gasoline synthesis reaction and the hydrogen generation reaction in a single reaction container.

The hydrogen generation reaction may be a reaction of generating hydrogen and carbon dioxide by steam-reforming methanol or may be a reaction of generating hydrogen and carbon monoxide by decomposing methanol.

According to another aspect of the present invention, there is provided an apparatus for producing gasoline and hydrogen from methanol, the apparatus including: a reaction container including a first reaction chamber for inducing a reaction of synthesizing gasoline from methanol, a second reaction chamber for inducing a reaction of generating hydrogen from methanol, and a heat conduction unit for conducting a heat generated in the first reaction chamber to the second reaction chamber; and a methanol supply path for supplying methanol to the first reaction chamber and the second reaction chamber of the reaction container.

The first reaction chamber may be filled with a catalyst for synthesizing gasoline from methanol. The second reaction chamber may be filled with a catalyst for generating hydrogen and carbon dioxide by steam-reforming methanol or a catalyst for generating hydrogen and carbon monoxide by decomposing methanol.

The heat conduction unit may have a tubular shape. The first reaction chamber may be arranged inside the tubular unit and the second reaction chamber may be arranged outside the tubular unit. Alternatively, the first reaction chamber may be arranged outside the tubular unit and the second reaction chamber may be arranged inside the tubular unit.

According to the present invention, a reaction temperature for synthesizing gasoline from methanol is approximately 400° C., which is higher by 70 to 125° C. than a reaction temperature for generating hydrogen from methanol, which is approximately 275° C. (by steam-reforming reaction) or approximately 330° C. (by decomposition reaction). The former reaction is an exothermic reaction and the latter one is an endothermic reaction, and both the reactions use the same material. Consequently, heat necessary for the hydrogen generating reaction of methanol can be provided easily and continuously from a heat generated due to the gasoline synthesizing reaction of methanol. Thus, an apparatus for inducing both reactions can be constructed without any complicated structure or without enlargement of the size. Further, gasoline and hydrogen can be obtained, thereby suppressing its total operating cost to a low level.

BRIEF DESCRIPTION OF DRAWINGS

FIG. 1 is a schematic view illustrating an embodiment of an apparatus for producing gasoline and hydrogen from methanol according to the present invention.

DESCRIPTION OF PREFERRED EMBODIMENTS

Hereinafter, an embodiment of the present invention will be described with reference to the accompanying drawings. As shown in FIG. 1, an apparatus for producing gasoline and hydrogen from methanol according to the present embodiment includes: a reactor 10 for producing gasoline and hydrogen from methanol; a methanol supplying path 20 for supplying methanol, which is a raw material, to this reactor 10; a gasoline discharge path 36 for discharging gasoline produced by this reactor 10; and a hydrogen discharge path 38 for discharging hydrogen generated in the reactor 10.

As shown in FIG. 1, the reactor 10 has a cylindrical shape and includes internally a distribution chamber 15a, a reaction chamber 13, and a collection chamber 15b, which are three sections separated in a longitudinal direction with a circular first partition wall 12a and second partition wall 12b. The reactor 10 includes a plurality of reaction tubes 14 provided in the reaction chamber 13 located in the center of the three sections. Both ends of the reaction tube 14 are fixed to the first partition wall 12a and the second partition wall 12b, and the inside of the reaction tubes 14 communicates with the distribution chamber 15a and the collection chamber 15b.

The reaction tube 14 accommodates a first catalyst layer 16 filled with catalyst for synthesizing gasoline from methanol. The first catalyst layer 16 synthesizes gasoline from methanol, which is a raw material, through reactions represented by the following reaction formulas 1 and 2.

$$2CH_3OH \rightarrow CH_3OCH_3 + H_2O \quad \text{(formula 1)}$$

$$\tfrac{1}{2}nCH_3OCH_3 \rightarrow (CH_2)n + \tfrac{1}{2}H_2O \quad \text{(formula 2)}$$

Consequently, through dimethyl ether (DME) synthesizing reaction represented by formula 1, methanol is converted to gasoline by a gasoline synthesizing reaction represented by formula 2. The first catalyst layer 16 includes two kinds of catalysts, DME synthesizing catalyst and gasoline synthesizing catalyst, which are provided on two separate stages inside thereof in order to progress two reactions in sequence. As the DME synthesizing catalyst, any known catalysts such as aluminosilicate type zeolite based catalyst may be used. Further, as the gasoline synthesizing catalyst, any known catalyst such as aluminosilicate type zeolite based catalyst may be used. These catalysts have been disclosed in detail in Japanese Patent Application Publication No. 50-076027 and Japanese Patent Application Publication No. 51-057688.

Further, the outside of the reaction tubes 14 within the reaction chamber 13 is provided with a second catalyst layer 18, which is filled with a catalyst for generating hydrogen from methanol. The second catalyst 18 generates hydrogen from methanol which is a raw material by reactions represented by the following reaction formulas 3 or 4.

$$CH_3OH + H_2O \rightarrow CO_2 + 3H_2 \quad \text{(formula 3)}$$

$$CH_3OH \rightarrow CO + 2H_2 \quad \text{(formula 4)}$$

Due to a steam-reforming reaction by adding steam as shown in formula 3, hydrogen and carbon dioxide are generated from methanol or due to a decomposition reaction as shown in formula 4, hydrogen and carbon monoxide are generated from methanol. As a catalyst for inducing steam-reforming, metallic catalysts such as Cu, Cu—Zn, Cu—Cr, Zn—Cr may be used. As a catalyst for inducing decomposition reaction, metallic catalysts such as Ni, Pt, Pd, Cu—Zn, Cu—Cr may be used.

The reactor 10 has a first supply port 22 for supplying methanol to the distribution chamber 15a and a first discharge port 32 for discharging synthesized gasoline. This first discharge port 32 is connected to the gasoline discharge path 36. The reactor 10 includes a second supply port 24 for supplying methanol to the reaction chamber 13 and a second discharge port 34 for discharging generated hydrogen. This second discharge port 34 is connected to the hydrogen discharge path 38.

The methanol supply path 20 is divided to two branch paths. A first supply path 20a for supplying methanol to synthesize gasoline is connected to the first supply port 22, and a second supply path 20b for supplying methanol for generating hydrogen is connected to the second supply port 24. The apparatus of the present invention includes a heat exchanger 26 which implements heat exchange between the first supply path 20a and the gasoline discharge path 36, and a heat exchanger 28 which also implements heat exchange between the second supply path 20b and the hydrogen discharge path 38. In the meantime, when implementing steam-reforming of methanol, the apparatus of the present invention is provided with a steam supply path 21 for adding steam to the second supply path 20b.

The synthesizing reaction from methanol to DME is an exothermic reaction and the synthesizing reaction from DME to gasoline is also an exothermic reaction. A preferred reaction temperature is 380° C. to 420° C. The steam-reforming and decomposition, which are reactions for generating hydrogen from methanol, are of endothermic reactions. A preferred reaction temperature of the steam-reforming is 250° C. to 300° C. and a preferred reaction temperature of the decomposition is 300° C. to 350° C. Thus, a heat generated in the first catalyst layer 16 can be used easily as a heat required by the second catalyst layer 18.

Conduction of heat is performed through the reaction tube 14. Although the material of the reaction tube 14 is not limited to any particular one as long as the material has an excellent heat conductivity and strength, the reaction tube 14 is preferred to be formed of, for example, carbon steel, chrome or molybdenum steel. Further, considering a pressure loss of methanol and gasoline which flow through the pipe, the inside diameter of the reaction tube 14 is preferred to be 19 to 300 mm, and more preferred to be 50 to 150 mm. Considering reaction conditions such as a temperature and pressures outside and inside of the reaction tube, the thickness of the reaction tube 14 is preferred to be 2 to 15 mm and more preferred to be 5 to 10 mm. The pressure inside the reaction tube 14 is preferred to be in a range of 3 to 8 kg/cm$^2$G. In case of steam-reforming, the pressure outside the reaction tube 14 is preferred to be in a range of 13 to 18 kg/cm$^2$G, and in case of decomposition, the pressure outside the reaction tube 14 is preferred to be in a range of 23 to 28 kg/cm$^2$G. In the meantime, FIG. 14 shows only three pipes as the reaction tubes 14 to facilitate understanding, specifically, a large number of the reaction tubes are provided depending on a production capability for gasoline and hydrogen of the apparatus.

A reaction heat (generation of heat) upon synthesizing of gasoline from methanol is 416 kcal per 1 kg of methanol. A reaction heat (absorption of heat) upon generating of hydrogen by steam-reforming of methanol is 369 kcal per 1 kg of methanol. A reaction heat (absorption of heat) upon generating of hydrogen and carbon monoxide by decomposition of methanol is 684 kcal per 1 kg of methanol. Thus, considering heat balance, upon generating of hydrogen by steam-reforming, assuming that a flow rate of the first supply path 20a is 100, a ratio of the flow rates of methanol between the first supply path 20a and the second supply path 20b is preferred to be 100 to 120, and is more preferred to be 105 to 115. Further, upon generating of hydrogen by decomposition, regarding a ratio of the flow rates of methanol between the first supply path 20a and the second supply path 20b, assuming that the flow rate of the first supply path 20a is 100, the flow rate of the second supply path 20b is preferred to 50 to 70 and is more preferred to be 55 to 65.

With the above-described configuration, first, methanol is supplied to the reactor 10 through the methanol supply path 20. Methanol, after being supplied through the first supply path 20a and then the first supply port 22, is introduced into the distribution chamber 15a of the reactor 10 and flows into a plurality of the reaction tubes 14. Further, methanol, after being supplied through the second supply path 20b and then the second supply port 24, is introduced into the reaction chamber 13 of the reactor 10 together with steam added from the steam supply path 21 as required. Upon start-up of the apparatus, it is preferable to heat methanol up to a predetermined temperature with heat exchangers 26, 28 which function as heaters arranged in the first supply path 20a and the second supply path 20b.

Within the reaction tube 14, the reactions based on the formulas 1 and 2 occur in the first catalyst 16 so as to synthesize gasoline under exothermic reaction. This heat heats the second catalyst layer 18 located on the outer periphery of the reaction tube 14 through the reaction tube 14. Within the reaction chamber 13, the reaction based on the formula 3 or 4 occurs in the second catalyst layer 18 so as to generate hydrogen and carbon monoxide or carbon dioxide. Because the gasoline synthesizing reaction in the first catalyst layer 16 induces a temperature higher by 30 to 80° C. than the hydrogen generation reaction in the second catalyst layer 18 as described above, a heat necessary for the endothermic reaction of the second catalyst layer 18 can be provided in the form of a heat generated in the first catalyst layer 16. Thus, synthesizing of gasoline in the first catalyst layer 16 and generation of hydrogen in the second catalyst layer 18 can be executed at the same time and continuously.

Gasoline generated in the first catalyst layer 16 within the reaction tube 14 is discharged out of the reactor 10 through the collection chamber 15 and the first discharge port 32. Then, the gasoline passes through the gasoline discharge path 36, heats methanol in the first supply path 20a with the heat exchanger 26, and is fed to the reactor 10. Hydrogen generated in the second catalyst layer 18 within the reaction chamber 13 is discharged out of the reactor 10 through the second discharge port 34. Then, after heating methanol in the second supply path 20b with the heat exchanger 28, the gasoline is fed to a specific facility (not shown).

As described above, heat necessary for generating hydrogen from methanol in the second catalyst layer 18 can be provided sufficiently and easily in the form of heat generated in the first catalyst layer 16 when synthesizing gasoline from methanol. No special apparatus for heating the second catalyst layer 18 to a predetermined temperature needs to be provided and no special apparatus for cooling the first catalyst layer 16 needs to be provided. Furthermore, raw materials of the reactions in the second catalyst layer and the first catalyst layer are the same, the raw material is methanol, and thus, a low cost can be attained both in the viewpoints of the production apparatus and operation. Products from the both catalyst layers are gasoline and hydrogen or gasoline, hydrogen and carbon monoxide. Both gasoline and hydrogen are consumed in a large quantity as fuel. Hydrogen and carbon monoxide are used for synthesis of chemical goods, and hydrogen and carbon monoxide can be supplied to users of both gasoline and hydrogen from this apparatus easily. Although, in the embodiment shown in FIG. 1, the first catalyst layer 16 inside the reaction tube 14 is used as a catalyst layer for synthesis of gasoline and the second catalyst layer 18 outside the reaction tube 14 is used as a catalyst layer for generation of hydrogen, the present invention is not restricted to this example, but similar effects can be obtained when the outside of the reaction tube 14 is used as a catalyst layer for synthesis of gasoline and the inside of the reaction tube 14 is used as a catalyst layer for generation of hydrogen.

EXAMPLE

Production of gasoline and hydrogen with the apparatus shown in FIG. 1 was simulated. For generation of hydrogen, two cases, by steam reforming and by decomposition were simulated. Explaining of the case by steam reforming, first, methanol was supplied to the first supply path 20a at a flow rate of 100 ton/h for synthesis of gasoline, and to the second supply path 20b at a flow rate of 112.7 ton/h for generation of hydrogen. Steam was supplied at a flow rate of 63.4 ton/h. As for the temperature of the methanol, methanol was supplied to the first supply port 22 at 380° C. for synthesis of gasoline, and to the second supply port 24 at 225° C. for generation of hydrogen. The temperature and the pressure of the first catalyst layer 16 in the reaction tube 14 were set to 400° C. and 5 kg/cm$^2$G respectively, and the temperature and the pressure of the second catalyst layer 18 in the reaction chamber 13 were set to 275° C. and 15 kg/cm$^2$G respectively. As a result, from the gasoline discharge path 36, gasoline of 320 bar/h, LPG of 42 bar/h, $C_1$, $C_2$ gases of 1,535 Nm$^3$/h, water of 50 ton/h were obtained, and from the hydrogen discharge path 38, hydrogen of 236,800 Nm$^3$/h and carbon dioxide of 78,900 Nm$^3$/h were obtained.

Next, a case of generating hydrogen by decomposing methanol will be described. As for the flow rate condition of methanol, methanol was supplied to the first supply path 20a at a flow rate of 100 ton/h for synthesis of gasoline, while methanol was supplied to the second supply path 20b at a flow rate of 60.8 ton/h for generation of hydrogen. As for the temperature of methanol, the methanol was supplied to the first supply port at 38° C. for synthesis of gasoline and to the second supply port 24 at 310° C. for generation of hydrogen. The temperature and pressure of the first catalyst layer 16 in the reaction chamber 14 were set to 400° C. and 5 kg/cm$^2$G respectively, and the temperature and pressure of the second catalyst layer 18 in the reaction chamber 13 were set to 330° C. and 25 kg/cm$^2$G. As a result, from the gasoline discharge path 36, gasoline of 320 bar/h, LPG of 42 bar/h, $C_1$, $C_2$ gases of 1,535 Nm$^3$/h, and water of 50 ton/h were obtained, and from the hydrogen discharge path 38, hydrogen of 140,000 Nm$^3$/h and carbon monoxide of 70,000 Nm$^3$/h were obtained.

What is claimed is:

1. An apparatus for producing gasoline and hydrogen from methanol, comprising:
    a reaction container comprising a first reaction chamber filled with a first catalyst for an exothermic reaction of synthesizing gasoline from methanol through dimethyl ether (DME), a second reaction chamber filled with a second catalyst for an endothermic reaction of generating hydrogen from methanol, and a heat conduction unit for conducting a heat generated in the first reaction chamber to the second reaction chamber; and
    a methanol supply path for dividing methanol into a first part of methanol and a second part of methanol, the methanol supply path comprising a first supply path for supplying the first part of methanol to the first reaction chamber and a second supply path for supplying the second part of methanol to the second reaction chamber of the reaction container,
    wherein the heat conduction unit has a multi-tubular shape, the tubes being filled with the first catalyst so that the first reaction chamber is arranged inside the tubes, and a space between the tubes in the reaction container being filled with the second catalyst so that the second reaction chamber is arranged in the space between the tubes.

2. The apparatus according to claim 1, wherein the second catalyst is a catalyst for generating hydrogen and carbon dioxide by steam-reforming methanol or a catalyst for generating hydrogen and carbon monoxide by decomposing methanol.

3. An apparatus for producing gasoline and hydrogen from methanol, comprising:
    a reaction container comprising a first reaction chamber filled with a first catalyst for an exothermic reaction of synthesizing gasoline from methanol through dimethyl ether (DME), a second reaction chamber filled with a second catalyst for an endothermic reaction of generating hydrogen from methanol, and a heat conduction unit for conducting a heat generated in the first reaction chamber to the second reaction chamber; and a methanol supply path for dividing methanol into a first part of methanol and a second part of methanol, the methanol supply path comprising a first supply path for supplying the first part of methanol to the first reaction chamber and a second supply path for supplying the second part of methanol to the second reaction chamber of the reaction container, wherein the heat conduction unit has a multi-tubular shape, a space between the tubes in the reaction container being filled with the first catalyst so that the first reaction chamber is arranged outside the tubes, and the tubes being filled with the second catalyst so that the second reaction chamber is arranged inside the tubes.

4. The apparatus according to claim 3, wherein the second catalyst is a catalyst for generating hydrogen and carbon dioxide by steam-reforming methanol or a catalyst for generating hydrogen and carbon monoxide by decomposing methanol.

5. The apparatus according to claim 1, wherein the first catalyst includes a DME synthesizing catalyst and a gasoline synthesizing catalyst, which are provided on two separate stages inside the first reaction chamber in order to progress two reactions in sequence.

6. The apparatus according to claim 3, wherein the first catalyst includes a DME synthesizing catalyst and a gasoline synthesizing catalyst, which are provided on two separate stages inside the first reaction chamber in order to progress two reactions in sequence.

* * * * *